US012277685B2

(12) United States Patent
Shino (10) Patent No.: US 12,277,685 B2
(45) Date of Patent: Apr. 15, 2025

(54) IMAGE PROCESSING APPARATUS, IMAGE PROCESSING METHOD, AND COMPUTER RECORDING MEDIUM FOR SYNTHESIZING A CORRECTED IMAGE WITH A TARGET IMAGE TO BE PROCESSED TO GENERATE A NEW IMAGE

(71) Applicant: NEC Corporation, Tokyo (JP)

(72) Inventor: Ryosaku Shino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 433 days.

(21) Appl. No.: 17/635,775

(22) PCT Filed: Jul. 16, 2020

(86) PCT No.: PCT/JP2020/027646
§ 371 (c)(1),
(2) Date: Feb. 16, 2022

(87) PCT Pub. No.: WO2021/039180
PCT Pub. Date: Mar. 4, 2021

(65) Prior Publication Data
US 2022/0309619 A1 Sep. 29, 2022

(30) Foreign Application Priority Data
Aug. 28, 2019 (JP) ................................ 2019-155159

(51) Int. Cl.
*G06T 5/70* (2024.01)
*G06T 5/50* (2006.01)
(Continued)

(52) U.S. Cl.
CPC ................. *G06T 5/70* (2024.01); *G06T 5/50* (2013.01); *G06T 5/92* (2024.01); *G06T 7/11* (2017.01);
(Continued)

(58) Field of Classification Search
CPC ....... G06T 5/70; G06V 10/141; G06V 10/267
See application file for complete search history.

(56) References Cited

U.S. PATENT DOCUMENTS 5,953,461 A * 9/1999 Yamada .................... G06T 5/70
382/266
2002/0141640 A1* 10/2002 Kraft ........................ G06T 5/94
382/167
(Continued)

FOREIGN PATENT DOCUMENTS

JP 2002-369004 A 12/2002
JP 2016-154810 A 9/2016
(Continued)

OTHER PUBLICATIONS

Nercessian et al., Non-Linear Direct Multi-Scale Image Enhancement Based on the Luminance and Contrast Masking Characteristics of the Human Visual System, in IEEE Transactions on Image Processing, vol. 22, No. 9, pp. 3549-3561, Sep. 2013, doi: 10.1109/TIP.2013.2262287.*

(Continued)

*Primary Examiner* — Guillermo M Rivera-Martinez (57) ABSTRACT

An image processing apparatus includes; a mask image generation unit that specifies a region having a luminance value higher than a specific value as a mask region from a target image, generates a mask image by setting the luminance value of a region other than the mask region to zero, a mask expansion processing unit that specifies a portion of a region around the mask region that satisfies a condition and expands the mask region to the peripheral region, a smoothed image generation unit that smooths the entire luminance value of the target image, a corrected image generation unit that specifies a region matching the expanded mask region and sets the luminance value of a region other than the specified region to zero to generate a
(Continued)

corrected image, an image synthesize unit that synthesizes the corrected image with the target image to generate a new image.

12 Claims, 7 Drawing Sheets

(51) Int. Cl.
*G06T 5/92* (2024.01)
*G06T 7/11* (2017.01)

(52) U.S. Cl.
CPC .............. *G06T 2207/10068* (2013.01); *G06T 2207/20192* (2013.01); *G06T 2207/20221* (2013.01)

(56) References Cited

U.S. PATENT DOCUMENTS

| | | | |
|---|---|---|---|
| 2003/0020974 A1 | 1/2003 | Matsushima | |
| 2007/0279500 A1* | 12/2007 | Castorina | G06T 5/20 348/254 |
| 2009/0034867 A1* | 2/2009 | Rempel | G06T 5/90 382/274 |
| 2011/0158515 A1* | 6/2011 | Chuang | H04N 1/58 382/163 |
| 2012/0020557 A1* | 1/2012 | Gaubatz | H04N 1/624 382/167 |
| 2014/0212032 A1* | 7/2014 | Maruta | G06T 7/136 382/164 |
| 2015/0131854 A1* | 5/2015 | Sano | G01N 15/1433 382/103 |
| 2016/0021391 A1* | 1/2016 | Su | H04N 19/136 375/240.12 |
| 2017/0061234 A1* | 3/2017 | Lim | G06T 3/40 |
| 2017/0302858 A1* | 10/2017 | Porter | H04N 23/72 |
| 2018/0052108 A1* | 2/2018 | Sofue | G06T 7/11 |
| 2018/0220893 A1* | 8/2018 | Tsumatori | G06V 10/25 |
| 2019/0116293 A1* | 4/2019 | Bury | G06T 5/70 |

FOREIGN PATENT DOCUMENTS

| | | |
|---|---|---|
| JP | 2018-128294 A | 8/2018 |
| JP | 6522869 B | 5/2019 |
| WO | 2011/087083 A1 | 7/2011 |

OTHER PUBLICATIONS

International Search Report for PCT Application No. PCT/JP2020/027646, mailed on Oct. 13, 2020.

English translation of Written opinion for PCT Application No. PCT/JP2020/027646, mailed on Oct. 13, 2020.

Extended European Search Report for EP Application No. 20858016.7 dated on Sep. 22, 2022.

Jinyu Zuo et al., "On a Methodology for Robust Segmentation of Nonideal Iris Images", IEEE Transactions on Systems, Man, and Cybernetics, Jun. 1, 2010 (Jun. 1, 2010), pp. 703-718.

Gevorg Karapetyan et al., "Automatic detection and concealment of specular reflections for endoscopic images", Ninth International Conference on Computer Science and Information Technologies Revised Selected Papers, IEEE, Sep. 23, 2013 (Sep. 23, 2013), pp. 1-8.

* cited by examiner

IMAGE PROCESSING APPARATUS, IMAGE PROCESSING METHOD, AND COMPUTER RECORDING MEDIUM FOR SYNTHESIZING A CORRECTED IMAGE WITH A TARGET IMAGE TO BE PROCESSED TO GENERATE A NEW IMAGE

This application is a National Stage Entry of PCT/JP2020/027646 filed on Jul. 16, 2020, which claims priority from Japanese Patent Application 2019-155159 filed on Aug. 28, 2019, the contents of all of which are incorporated herein by reference, in their entirety.

TECHNICAL FIELD

The present invention relates to an image processing apparatus and an image processing method for performing image processing on images that are prone to shine, such as images taken with an endoscope, and also to a computer readable recording medium having recorded therein a program for realizing these apparatus and method.

BACKGROUND ART

In recent years, due to higher precision of solid-state image sensors and improvements in image processing technology, apparatuses for performing pathological diagnosis from images taken by an endoscope in a human body have been proposed. For example, Patent Document 1 discloses an apparatus that extracts a feature of a cell nucleus from an image taken with an endoscope and performs a pathological diagnosis based on the extracted feature and a result of texture analysis of the image.

In the human body to be photographed by the endoscope, a liquid such as a body fluid exists. Further, a light for illuminating the subject is provided at a tip of the endoscope. For this reason, a shiny portion often occurs in the image taken by the endoscope. When such shiny portion occurs, the shiny portion is extracted as a feature. Therefore, Patent Document 2 discloses a technique for removing shiny portion from the image taken by the endoscope.

In the technique disclosed in Patent Document 2, first, a region in which shiny portion occurs (hereinafter referred to as "shiny region") is specified from the image converted to gray scale. Next, a region including and larger than the shiny region is set as an exclusion region, and the exclusion region is removed from the image. Then, the area where the excluded area is present in the image is corrected based on the pixels around the excluded area. By using the image corrected in this way, since the shiny portion is removed, the problem that the shiny portion is extracted as the feature is solved.

LIST OF RELATED ART DOCUMENTS

Patent Document

Patent document 1: Japanese Patent Laid-Open Publication No. 2016-154810
Patent document 2: Japanese Patent Laid-Open Publication No. 2018-128294

SUMMARY OF INVENTION

Problems to be Solved by the Invention

However, in the technique disclosed in Patent Document 2, as described above, the region covering the shiny region is uniformly corrected based on the pixels around the region. For this reason, edges existing near the shiny region disappear, and as a result, the feature extraction accuracy may decrease.

An example of object of the present invention is to provide an image processing apparatus, an image processing method, and a computer-readable recording medium that solve the aforementioned problem and suppress the disappearance of edges in the image when correcting the shiny portion occurred in the image.

Means for Solving the Problems

In order to achieve the above-described object, an image processing apparatus according to an example aspect of the invention includes:

a mask image generation unit that specifies a region having a luminance value higher than a specific value as a mask region from a target image to be processed, further generates a mask image by setting the luminance value of a region other than the mask region to zero in the image, a mask expansion processing unit that specifies a portion of a region around the mask region that satisfies a condition for luminance in the mask image and expands the mask region to the peripheral region excluding the specified portion.

a smoothed image generation unit that smooths the entire luminance value of the target image to be processed to generate a luminance value smoothed image, a corrected image generation unit that specifies a region matching the expanded mask region in the luminance value smoothed image and sets the luminance value of a region other than the specified region to zero to generate a corrected image, an image synthesize unit that synthesizes the corrected image with the target image to be processed to generate a new image.

In order to achieve the above-described object, an image processing method according to an example aspect of the invention includes:

a mask image generation step of specifying a region having a luminance value higher than a specific value as a mask region from a target image to be processed, further generating a mask image by setting the luminance value of a region other than the mask region to zero in the image, a mask expansion processing step of specifying a portion of a region around the mask region that satisfies a condition for luminance in the mask image and expanding the mask region to the peripheral region excluding the specified portion.

a smoothed image generation step of smoothing the entire luminance value of the target image to be processed to generate a luminance value smoothed image, a corrected image generation step of specifying a region matching the expanded mask region in the luminance value smoothed image and setting the luminance value of a region other than the specified region to zero to generate a corrected image, an image synthesize step of synthesizing the corrected image with the target image to be processed to generate a new image.

Furthermore, in order to achieve the above-described object, a computer readable recording medium according to an example aspect of the invention that includes a program recorded thereon, the program including instructions that cause a computer to carry out:

a mask image generation step of specifying a region having a luminance value higher than a specific value as a mask region from a target image to be processed, further generating a mask image by setting the luminance value of a region other than the mask region to zero in the image, a mask expansion processing step of specifying a portion of a region around the mask region that satisfies a condition for luminance in the mask image and expanding the mask region to the peripheral region excluding the specified portion.

a smoothed image generation step of smoothing the entire luminance value of the target image to be processed to generate a luminance value smoothed image, a corrected image generation step of specifying a region matching the expanded mask region in the luminance value smoothed image and setting the luminance value of a region other than the specified region to zero to generate a corrected image, an image synthesize step of synthesizing the corrected image with the target image to be processed to generate a new image.

Advantageous Effects of the Invention

As described above, according to the present invention, it is possible to suppress the disappearance of edges in the image when correcting the shiny portion occurred in the image.

EXAMPLE EMBODIMENT

Example Embodiment

The following describes an image processing apparatus, an image processing method, and a program according to an example embodiment with reference to FIGS. 1 to 7.

[Apparatus Configuration]

Figure 1:
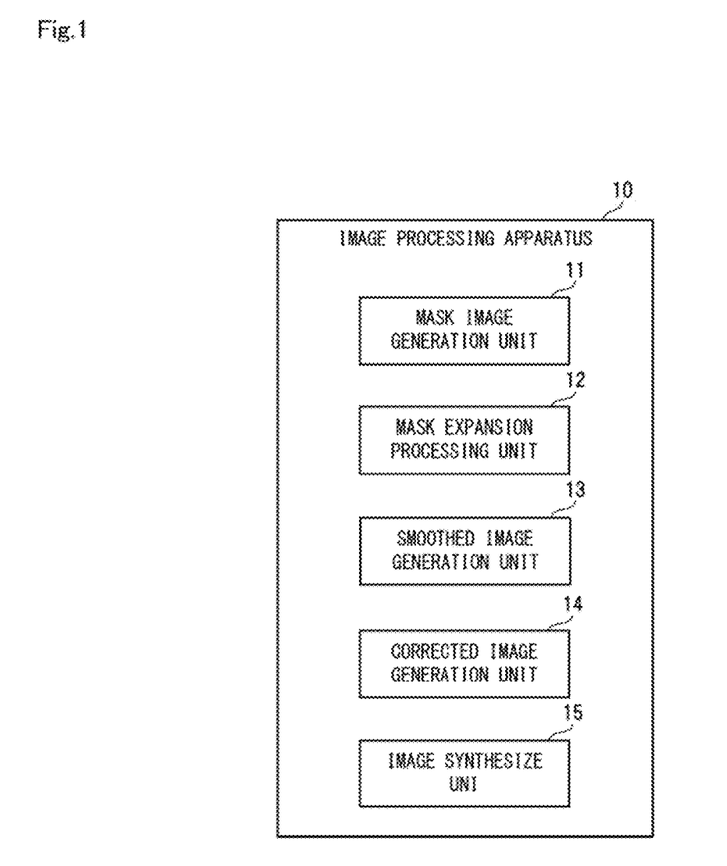
FIG. 1 is a block diagram schematically illustrating a configuration of an image processing apparatus according to an example embodiment.

First, a schematic configuration of the image processing apparatus according to the example embodiment will be described. FIG. 1 is a block diagram schematically illustrating a configuration of an image processing apparatus according to an example embodiment.

The image processing apparatus 10 according to the example embodiment shown in FIG. 1 is an apparatus for performing image processing on an image in which a shiny portion is likely to occur, such as an image taken by an endoscope. As shown in FIG. 1, the image processing apparatus 10 includes a mask image generation unit 11, a mask extension processing unit 12, a smoothed image generation unit 13, a corrected image generation unit 14, and an image synthesize unit 15.

First, the mask image generation unit 11 specifies a region having a luminance value higher than a specific value as a mask region from the target image to be processed. Subsequently, the mask image generation unit 11 generates a mask image by setting the luminance value of the region other than the mask region to zero in this image.

In the mask image, the mask expansion processing unit 12 specifies a portion of a peripheral region of the mask region that satisfies a condition for luminance in the mask image, and expands the mask region to the peripheral region excluding the specified portion.

Further, the smoothed image generation unit 13 smooths the entire luminance value of the target image to be processed to generate a luminance value smoothed image.

The corrected image generation unit 14 specifies a region matching the expanded mask region in the luminance value smoothed image generated by the smoothed image generation unit 13. Then, the corrected image generation unit 14 sets the luminance value of a region other than the specified region to zero to generate a corrected image.

The image synthesize unit 15 synthesizes the target image to be processed with the corrected image that is generated by the corrected image generation unit 14, to generate a new image.

As described above, in the example embodiment, the shiny portion and the periphery of the shiny portion are replaced by the image in which the luminance value is smoothed. However, of the peripheral portion, a portion satisfying a certain condition, for example, an edge portion is excluded from the replacement target. Therefore, according to the example embodiment, it is possible to suppress the disappearance of edges in the image when correcting the shiny portion occurred in the image.

Figure 2:
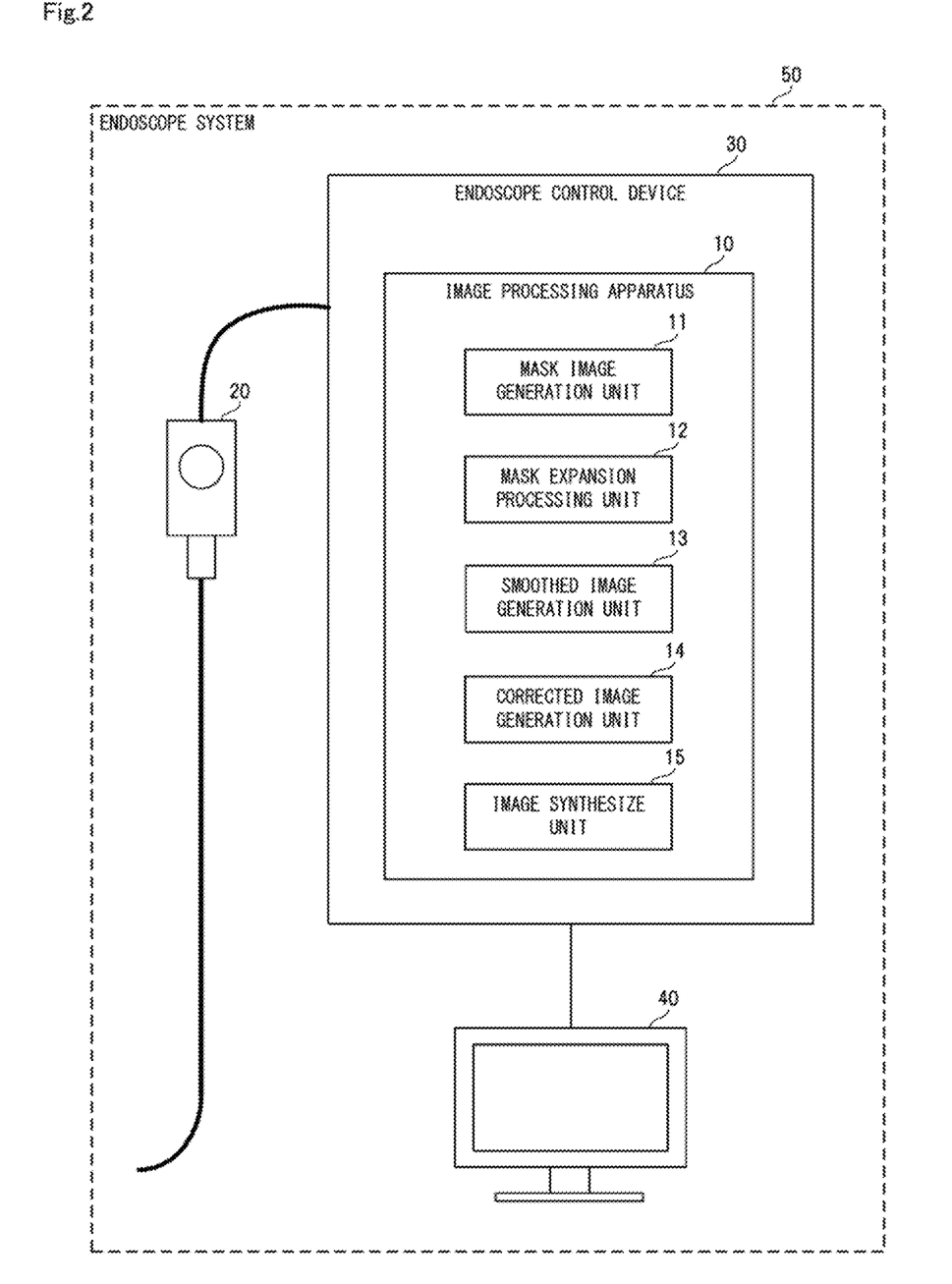
FIG. 2 is a block diagram specifically illustrating the configuration of the image processing apparatus according to the example embodiment.
Figure 3:
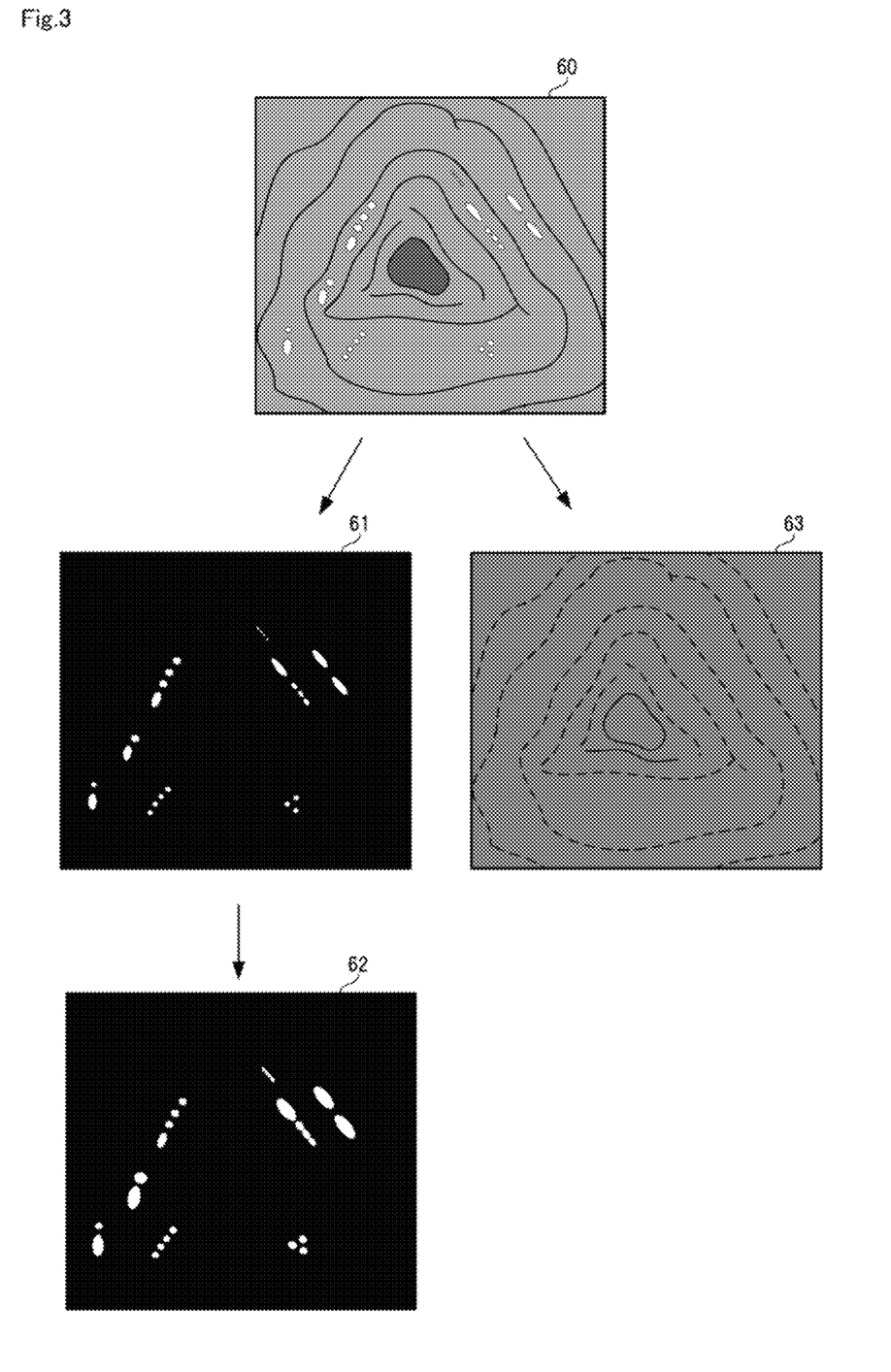
FIG. 3 is a diagram illustrating the processing performed by the mask image generation unit, the mask expansion processing unit, and the smoothed image generation unit shown in the FIG. 2.
Figure 4:
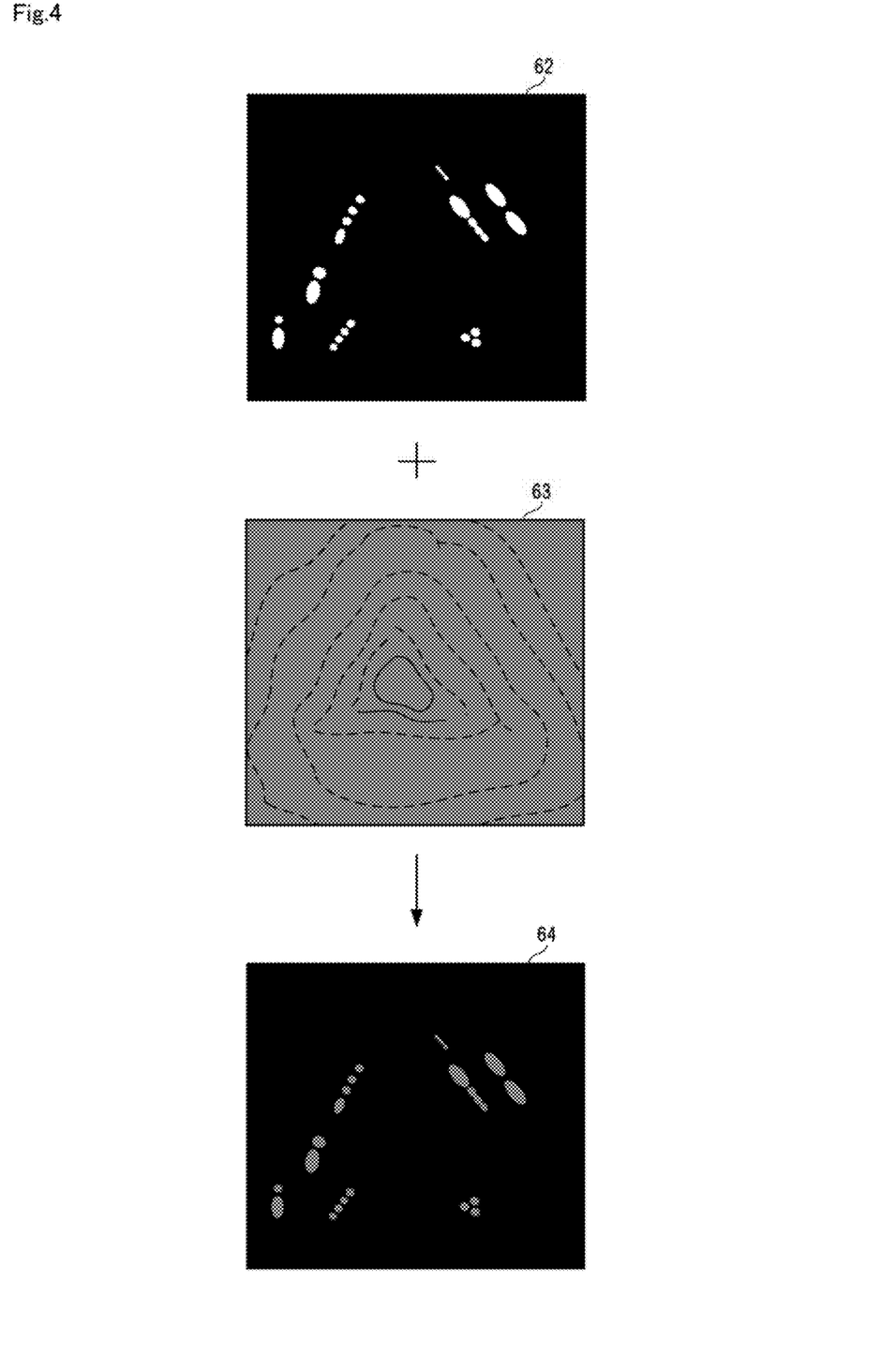
FIG. 4 is a diagram illustrating the processing performed by the corrected image generation unit shown in the FIG. 2.
Figure 5:
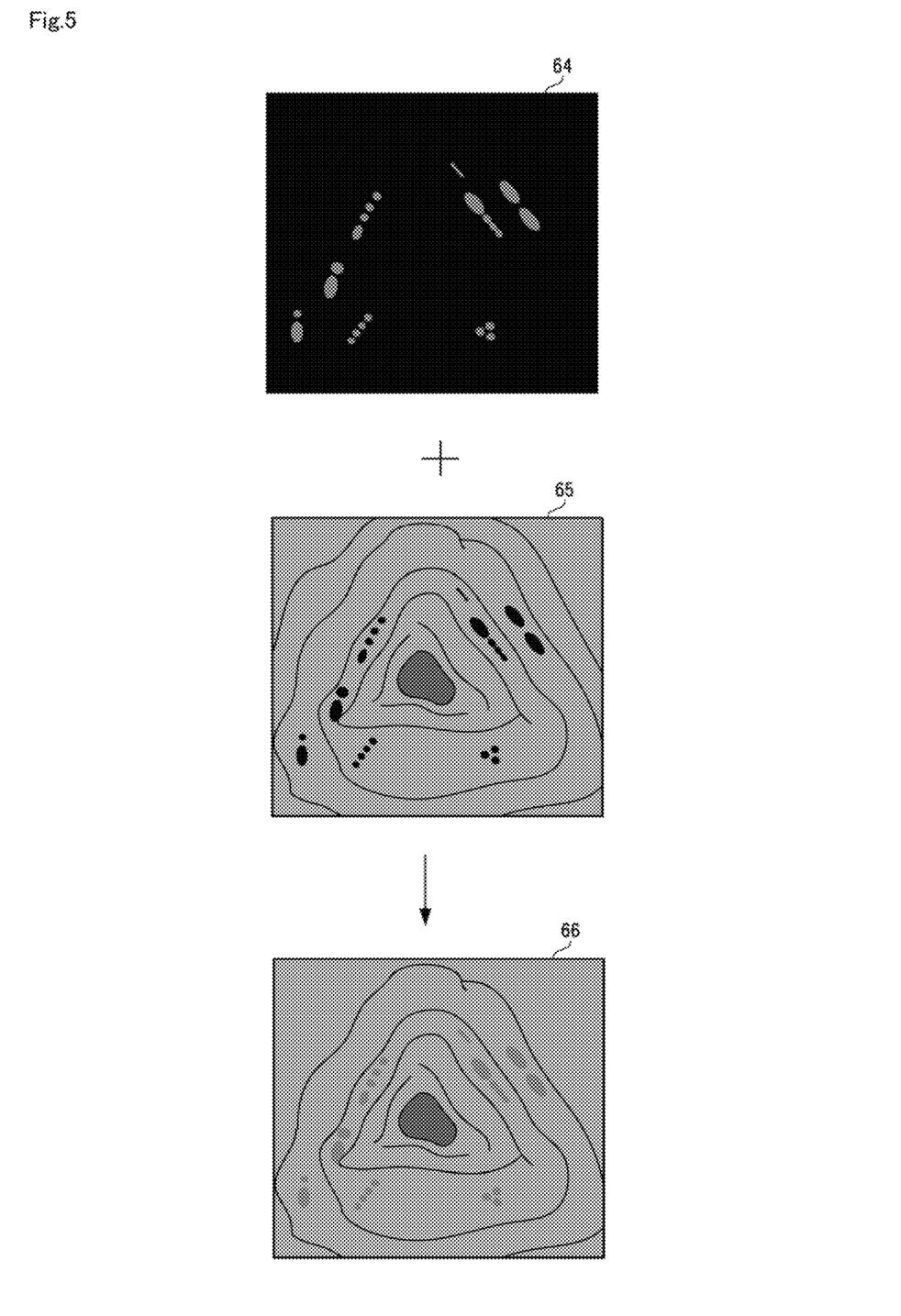
FIG. 5 is a diagram illustrating the processing performed by the image synthesize unit shown in the FIG. 2.

Next, the configuration and function of the image processing apparatus 10 according to the example embodiment will be described more specifically with reference to FIGS. 2 to 5. FIG. 2 is a block diagram specifically illustrating the configuration of the image processing apparatus according to the example embodiment. FIG. 3 is a diagram illustrating the processing performed by the mask image generation unit, the mask expansion processing unit, and the smoothed image generation unit shown in the FIG. 2. FIG. 4 is a diagram illustrating the processing performed by the corrected image generation unit shown in the FIG. 2. FIG. 5 is a diagram illustrating the processing performed by the image synthesize unit shown in the FIG. 2.

As shown in FIG. 2, in the example embodiment, the image processing apparatus 10 constitutes a part of the endoscope system 50. Specifically, the endoscope system 50 includes an endoscope 20, an endoscope control device 30 for controlling the endoscope 20, and a display device 40 for displaying an image taken by the endoscope. The image processing apparatus 10 is incorporated in the endoscope control device 30. More specifically, the image processing apparatus 10 is constructed by a computer for constructing the endoscope control device 30 executing the program in example embodiment described later.

Therefore, in the example embodiment, as shown in FIG. 3, the image processing apparatus 10 acquires an image taken by the endoscope 20 as an target image to be processed 60. The target image to be processed 60 is sent to the mask image generation unit 11, the smoothed image generation unit 13 and the image synthesize unit 15.

First, the mask image generation unit 11 converts the target image 60 to be processed to gray scale, identifies a region whose luminance value is equal to or higher than a specific threshold value from the converted image, and sets the identified region as a mask region. Next, the mask image generation unit 11 sets the luminance value of the pixel in the specified mask region to "255" and sets the luminance value of the pixel in the other region to "0". As a result, the mask image 61 shown in FIG. 3 is generated.

In the example embodiment, the mask expansion processing unit 12 expands the mask region in the mask image 61 by a set number of pixels along the outer edge of the mask image 61, and generates the expanded mask image 62 shown in FIG. 3 by removing a portion of the expanded portion that satisfies a condition for the luminance.

Specifically, the mask expansion processing unit 12 first executes expansion processing using, for example, the Dilate function of OpenCV, and sets the luminance value of the expanded portion to "255". At this time, the mask expansion processing unit 12 sets, for example, 5 times 5 matrix in which all matrix elements are 1.0 as a filter for the argument of the dilate function.

Next, the mask expansion processing unit 12 extracts edges from the target image 60 to be processed. Edge is extracted, for example, by applying a Laplacian filter to the target image 60 to be processed. Then, the mask expansion processing unit 12 compares the edge extracted from the target image 60 to be processed with the peripheral region around the mask region (expanded portion of the mask image 61). The mask expansion processing unit 12 specifies a portion where the edge and the peripheral region overlap as a portion that satisfies the condition for luminance.

Further, the mask expansion processing unit 12 sets the luminance value of the pixel in the portion satisfying the condition for luminance in the mask image to which only the expansion processing is performed to "0". As a result, the expanded mask image 62 shown in FIG. 3 is generated.

In the example embodiment, the smoothed image generation unit 13 executes the smoothing process so that the change in the luminance value of the entire target image 60 to be processed is equal to or less than the threshold value. Specifically, the smoothed image generation unit 13 executes the average value blur process on the target image 60 to be processed by using, for example, the median Blur function of OpenCV. At this time, the kernel size is set to, for example, 15. As a result, the luminance value smoothed image 63 shown in FIG. 3 is generated.

In the example embodiment, the corrected image generation unit 14 specifies a region corresponding to the mask region of the expanded mask image 62 in the luminance value smoothed image 63 and sets the luminance value of the region other than the specified region to "0". As a result, the corrected image 64 shown in FIG. 4 is generated.

In the example embodiment, the image synthesize unit 15 first specifies a region corresponding to the mask region of the expanded mask image 62 in the target image 60 to be processed and sets the luminance value of the region to "0". As a result, the target image 60 to be processed becomes the image 65 shown in FIG. 5. Hereinafter, the image 65 is referred to as a "background image 65".

Next, the image synthesize unit 15 embeds a portion of the corrected image 64 whose luminance value is not "0" in the region where the luminance value of the background image 65 is "0", and synthesizes the corrected image 64 and the background image 65. As a result, the corrected target image 60 to be processed (hereinafter referred to as "corrected target image") 66 shown in FIG. 5 is generated. In the corrected target image 66, the shiny portion existing in the original target image 60 to be processed is removed without damaging the edges.

[Apparatus Operations]

Figure 6:
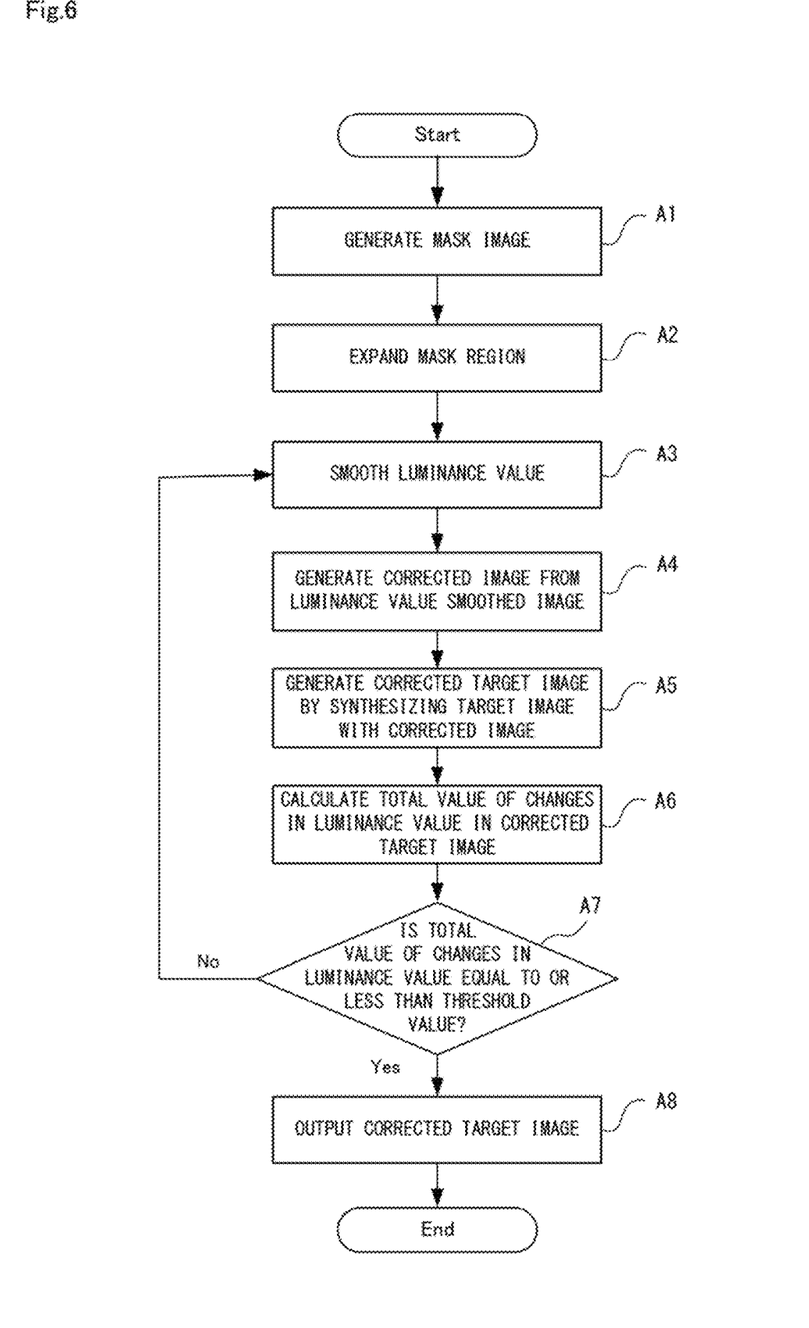
FIG. 6 is a flow diagram illustrating an operation of the image processing apparatus according to the example embodiment.

Next, the operation of the image processing apparatus 10 in the example embodiment will be described with reference to FIG. 6. FIG. 6 is a flow diagram illustrating an operation of the image processing apparatus according to the example embodiment. In the following description, FIGS. 1 to 5 will be referred to as appropriate. Further, in the example embodiment, the image processing method is implemented by operating the image processing apparatus 10. Therefore, the following description of the operation of the image processing apparatus 10 applies to the image processing method according to the example embodiment.

First, as a premise, in the endoscope system 50, an image data of the image taken by the endoscope 20 is output to the endoscope control device 30 for each frame. The output image data is sent to the image processing apparatus 10 as image data of the target image 60 to be processed.

As shown in FIG. 6, in the image processing apparatus 10, first, the mask image generation unit 11 specifies the region having a luminance value higher than the specific value as the mask region from the target image 60 to be processed, and generates the mask image 61 by setting the luminance value of the region other than the mask region to "0" in the target image 60 to be processed (step A1).

Specifically, in step A1, the mask image generation unit 11 sets the luminance value of the pixel in the specified mask region to "255", and sets the luminance value of the pixel in the other region to "0".

Next, the mask expansion processing unit 12 specifies the portion of the peripheral region of the mask region that satisfies the condition for luminance in the mask image generated in step A1, and expands the mask region to the peripheral region excluding the specified portion (Step A2). As a result, the expanded mask image 62 shown in FIG. 3 is generated.

Specifically, in step A2, the mask expansion processing unit 12 first executes expansion processing using, for example, the Dilate function of OpenCV, and sets the luminance value of the expanded portion to "255". Next, the mask expansion processing unit 12 extracts edges from the target image 60 to be processed, compares the extracted edge with the peripheral region around the mask region, and specifies a portion where the edge and the peripheral region overlap as a portion that satisfies the condition for luminance. After that, the mask expansion processing unit 12 sets the luminance value of the pixel in the portion satisfying the condition for luminance in the mask image to which only the expansion processing is performed to "0".

Next, the smoothed image generation unit 13 generates the luminance value smoothed image 63 by smoothing the entire luminance value of the target image 60 to be processed (step A3). Specifically, the smoothed image generation unit 13 executes the average value blur process on the target image 60 to be processed by using, for example, the median Blur function of OpenCV.

Next, the corrected image generation unit 14 specifies a region corresponding to the expanded mask region in the luminance value smoothed image 63 generated in step A3, sets the luminance value of the region other than the specified region to "0" and generates the corrected image 64 (step A4).

Next, the image synthesize unit 15 synthesizes the target image 60 to be processed with the corrected image that is generated by the corrected image generation unit 14, to generate the corrected target image 66 (step A5).

Specifically, the image synthesize unit 15 sets the luminance value of a region corresponding to the mask region of the expanded mask image 62 to "0" in the target image 60 to be processed and generates the background image 65. Then, the image synthesize unit 15 embeds a portion of the corrected image 64 whose luminance value is not "0" in the region where the luminance value of the background image 65 is "0", and synthesizes the corrected image 64 and the background image 65.

Next, the image synthesize unit 15 calculates a total value of the changes in the luminance value in the corrected target image 66 (step A6). Then, the image synthesize unit 15 determines whether or not the calculated total value of the changes in the luminance value is equal to or less than a threshold value (step A7).

As a result of the determination in step A7, if the calculated total value of the changes in the luminance value exceeds the threshold value, step A3 is executed again. However, in step A3 to be re-executed, the smoothing process is performed on the latest corrected target image 66.

On the other hand, as a result of the determination in step A7, if the calculated total value of the changes in the luminance value is equal to or less than the threshold value, the image synthesize unit 15 outputs the image data of the corrected target image 66 to the display device 40 (step A8). As a result, the corrected target image 66 is displayed on the screen of the display device 40.

Effects of Example Embodiment

As described above, in the example embodiment, the corrected target image 66 shown in FIG. 5 is generated and displayed on the screen. In the corrected target image 66, the shiny portion existing in the original target image 60 to be processed 60 is removed without damaging the edges. Therefore, according to the example embodiment, it is possible to suppress the disappearance of edges in the image when correcting the shiny portion occurred in the image.

[Program]

It is sufficient that the program according to the example embodiment be a program that causes a computer to execute steps A1 to A8 illustrated in FIG. 6. The image processing apparatus 10 and the image processing method according to the example embodiment can be realized by installing this program in the computer and executing this program. In this case, a processor of the computer functions and performs processing as the mask image generation unit 11, the mask expansion processing unit 12, the smoothed image generation unit 13, the corrected image generation unit 14, and the image synthesize unit 15.

Also, the program according to the example embodiment may be executed by a computer system constructed by a plurality of computers. In this case, for example, each computer may function as one of the mask image generation unit 11, the mask expansion processing unit 12, the smoothed image generation unit 13, the corrected image generation unit 14, and the image synthesize unit 15.

Figure 7:
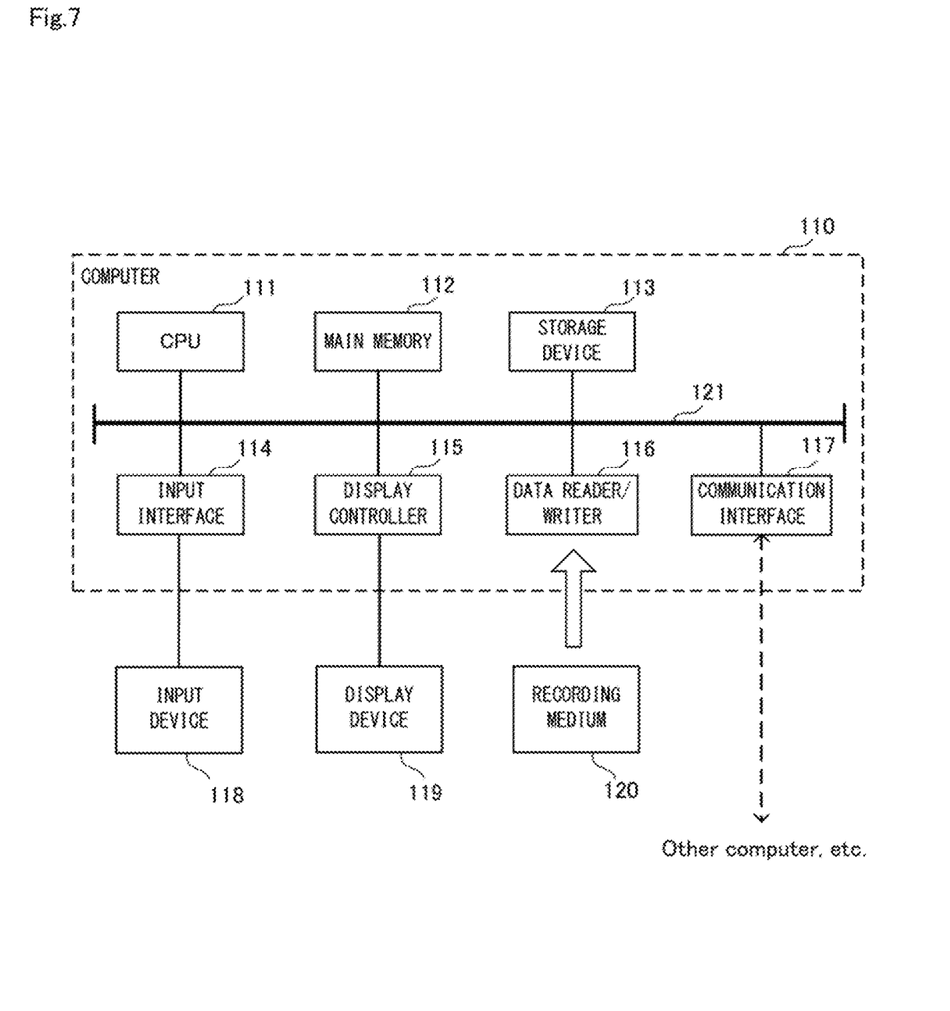
FIG. 7 is a block diagram illustrating an example of a computer that realizes the image processing apparatus according to the example embodiments.

Using FIG. 7, a description is now given of the physical configuration of a computer that realizes the image processing apparatus by executing the program according to the first to third example embodiments. FIG. 7 is a block diagram illustrating an example of a computer that realizes the image processing apparatus according to the example embodiments.

As illustrated in FIG. 7, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121. Note that the computer 110 may include a GPU (Graphics Processing Unit) or an FPGA (Field-Programmable Gate Array) in addition to the CPU 111 or in place of the CPU 111.

The CPU 111 carries out various types of computation by deploying the program (codes) according to the example embodiment stored in the storage device 113 to the main memory 112, and executing the codes constituting the program in a predetermined order. The main memory 112 is typically a volatile storage device, such as a DRAM (Dynamic Random-Access Memory). Also, the program according to the present example embodiment is provided in a state where it is stored in a computer readable recording medium 120. Note that the program according to the present example embodiment may also be distributed over the Internet connected via the communication interface 117.

Furthermore, specific examples of the storage device 113 include a hard disk drive, and also a semiconductor storage device, such as a flash memory. The input interface 114 mediates data transmission between the CPU 111 and an input device 118, such as a keyboard and a mouse. The display controller 115 is connected to a display device 119, and controls displays on the display device 119.

The data reader/writer 116 mediates data transmission between the CPU 111 and the recording medium 120, and executes readout of the program from the recording medium 120, as well as writing of the result of processing in the computer 110 to the recording medium 120. The communication interface 117 mediates data transmission between the CPU 111 and another computer.

Also, specific examples of the recording medium 120 include: a general-purpose semiconductor storage device, such as CF (Compact Flashc) and SD (Secure Digital); a magnetic recording medium, such as Flexible Disk; and an optical recording medium, such as CD-ROM (Compact Disk Read Only Memory).

Note that the image processing apparatus 10 according to the example embodiments can also be realized by using items of hardware corresponding to respective components, rather than by using the computer with the program installed therein. Furthermore, a part of the image processing apparatus 10 may be realized by the program, and the remaining part of the image processing apparatus 10 may be realized by hardware.

A part or all of the aforementioned example embodiment can be described as, but is not limited to, the following (Supplementary note 1) to (Supplementary note 12).

(Supplementary Note 1)

An image processing apparatus comprising:

a mask image generation unit that specifies a region having a luminance value higher than a specific value as a mask region from a target image to be processed, further generates a mask image by setting the luminance value of a region other than the mask region to zero in the image, a mask expansion processing unit that specifies a portion of a region around the mask region that satisfies a condition for luminance in the mask image and expands the mask region to the peripheral region excluding the specified portion.

a smoothed image generation unit that smooths the entire luminance value of the target image to be processed to generate a luminance value smoothed image, a corrected image generation unit that specifies a region matching the expanded mask region in the luminance value smoothed image and sets the luminance value of a region other than the specified region to zero to generate a corrected image, an image synthesize unit that synthesizes the corrected image with the target image to be processed to generate a new image.

(Supplementary Note 2)

The image processing apparatus according to Supplementary Note 1, wherein the mask expansion processing unit expands the mask region in the mask image by a set number of pixels along the outer edge thereof and expands the mask image by removing a portion of the expanded portion that satisfies a condition for the luminance.

(Supplementary Note 3)

The image processing apparatus according to Supplementary Note 1 or 2, wherein the mask expansion processing unit compares an edge extracted from the target image to be processed with the region around the mask region and specifies a portion where both overlap as the portion satisfying the condition for luminance.

(Supplementary Note 4)

The image processing apparatus according to any of Supplementary Notes 1 to 3, wherein the smoothed image generation unit generates the luminance value smoothed image by setting a change in the luminance value in the entire target image to be processed to be equal to or less than a threshold value.

(Supplementary Note 5)

An image processing method comprising:

a mask image generation step of specifying a region having a luminance value higher than a specific value as a mask region from a target image to be processed, further generating a mask image by setting the luminance value of a region other than the mask region to zero in the image, a mask expansion processing step of specifying a portion of a region around the mask region that satisfies a condition for luminance in the mask image and expanding the mask region to the peripheral region excluding the specified portion.

a smoothed image generation step of smoothing the entire luminance value of the target image to be processed to generate a luminance value smoothed image, a corrected image generation step of specifying a region matching the expanded mask region in the luminance value smoothed image and setting the luminance value of a region other than the specified region to zero to generate a corrected image, an image synthesize step of synthesizing the corrected image with the target image to be processed to generate a new image.

(Supplementary Note 6)

The image processing method according to Supplementary Note 5, wherein in the mask expansion processing step, expanding the mask region in the mask image by a set number of pixels along the outer edge thereof and expanding the mask image by removing a portion of the expanded portion that satisfies a condition for the luminance.

(Supplementary Note 7)

The image processing method according to Supplementary Note 5 or 6, wherein in the mask expansion processing step, comparing an edge extracted from the target image to be processed with the region around the mask region and specifying a portion where both overlap as the portion satisfying the condition for luminance.

(Supplementary Note 8)

The image processing method according to any of Supplementary Notes 5 to 7, wherein in the smoothed image generation step, generating the luminance value smoothed image by setting a change in the luminance value in the entire target image to be processed to be equal to or less than a threshold value.

(Supplementary Note 9)

A computer readable recording medium that includes a program recorded thereon, the program including instructions that cause a computer to carry out:

a mask image generation step of specifying a region having a luminance value higher than a specific value as a mask region from a target image to be processed, further generating a mask image by setting the luminance value of a region other than the mask region to zero in the image, a mask expansion processing step of specifying a portion of a region around the mask region that satisfies a condition for luminance in the mask image and expanding the mask region to the peripheral region excluding the specified portion.

a smoothed image generation step of smoothing the entire luminance value of the target image to be processed to generate a luminance value smoothed image, a corrected image generation step of specifying a region matching the expanded mask region in the luminance value smoothed image and setting the luminance value of a region other than the specified region to zero to generate a corrected image, an image synthesize step of synthesizing the corrected image with the target image to be processed to generate a new image.

(Supplementary Note 10)

The computer readable recording medium according to Supplementary Note 9, wherein in the mask expansion processing step, expanding the mask region in the mask image by a set number of pixels along the outer edge thereof and expanding the mask image by removing a portion of the expanded portion that satisfies a condition for the luminance.

(Supplementary Note 11)

The computer readable recording medium according to Supplementary Note 9 or 10, wherein in the mask expansion processing step, comparing an edge extracted from the target image to be processed with the region around the mask region and specifying a portion where both overlap as the portion satisfying the condition for luminance.

(Supplementary Note 12)

The computer readable recording medium according to any of Supplementary Notes 9 to 11, wherein in the smoothed image generation step, generating the luminance value smoothed image by setting a change in the luminance value in the entire target image to be processed to be equal to or less than a threshold value.

The invention has been described with reference to an example embodiment above, but the invention is not limited to the above-described example embodiment. Within the scope of the invention, various changes that could be understood by a person skilled in the art could be applied to the configurations and details of the invention.

This application claims the benefit of Japanese Patent Application No. 2019-155159, filed Aug. 28, 2019, which is hereby incorporated by reference in its entirety.

INDUSTRIAL APPLICABILITY

According to the present invention, it is possible to suppress the disappearance of edges in the image when correcting the shiny portion occurred in the image. The present invention is useful for a system, for example, an endoscopic system, which targets a subject in which shiny portion is likely to occur.

REFERENCE SIGNS LIST 10 image processing apparatus
11 mask image generation unit
12 mask expansion processing unit
13 smoothed image generation unit
14 corrected image generation unit
15 image synthesize unit
20 endoscope
30 endoscope control apparatus
40 display device
50 endoscope system
60 target image to be processed
61 mask image
62 expanded mask image
63 luminance value smoothed image
64 corrected image
65 background image
66 corrected target image
110 computer
111 CPU
112 main memory
113 storage device
114 input interface
115 display controller
116 data reader/writer
117 communication interface
118 input device
119 display device
120 recording medium
121 bus

What is claimed is:

1. An image processing apparatus comprising:
a memory storing instructions; and
at least one processor configured to execute the instructions to:
specify a region having a luminance value higher than a specific value as a mask region, from a target image to be processed, the image to be processed being an inside of a human body;
generate a mask by setting the luminance value of a region other than the mask region to zero in the image to be processed;
extract an edge from the target image to be processed as a whole;
specify a portion of a region around the mask region that overlaps with the edge, such that the specified portion is defined as that which satisfies a condition for luminance in the mask image;
expand the mask region to the peripheral region excluding the specified portion by a set number of pixels along an outer edge of the mask region;
smooth the luminance value of an entirety of the target image to be processed to generate a luminance value smoothed image;
specify a region matching the expanded mask region in the luminance value smoothed image;
set the luminance value of a region other than the specified region matching the expanded mask region in the luminance value smoothed image to zero to generate a corrected image; and
synthesize the corrected image with the target image to be processed to generate a new image.

2. The image processing apparatus according to claim 1, wherein
the at least one processor further expands the mask region by removing the specified portion that satisfies the condition for the luminance.

3. The image processing apparatus according to claim 1, wherein
the at least one processor compares the edge extracted from the target image to be processed with the region around the mask region to specify the portion that overlaps with the edge.

4. The image processing apparatus according to claim 1, wherein
the at least one processor generates the luminance value smoothed image by setting a change in the luminance value of the entirety of the target image to be processed to be equal to or less than a threshold value.

5. An image processing method performed by a computer and comprising:
specifying a region having a luminance value higher than a specific value as a mask region, from a target image to be processed, the image to be processed being an inside of a human body;
generating a mask image by setting the luminance value of a region other than the mask region to zero in the image to be processed;
specifying a portion of a region around the mask region that overlaps with the edge, such that the specified portion is defined as that which satisfies a condition for luminance in the mask image;
expanding the mask region to the peripheral region excluding the specified portion by a set number of pixels along an outer edge of the mask region;
smoothing the luminance value of an entirety of the target image to be processed to generate a luminance value smoothed image;
specifying a region matching the expanded mask region in the luminance value smoothed image;
setting the luminance value of a region other than the specified region matching the expanded mask region in the luminance value smoothed image to zero to generate a corrected image; and
synthesizing the corrected image with the target image to be processed to generate a new image.

6. The image processing method according to claim 5, further comprising expanding the mask image by removing the specified portion that satisfies the condition for the luminance.

7. The image processing method according to claim 5, further comprising comparing the edge extracted from the target image to be processed with the region around the mask region to specify the portion that overlaps with the edge.

8. The image processing method according to claim 5, further comprising generating the luminance value smoothed image by setting a change in the luminance value of the entirety of the target image to be processed to be equal to or less than a threshold value.

9. A non-transitory computer readable recording medium storing a program executable by a computer to perform processing comprising:
 specifying a region having a luminance value higher than a specific value as a mask region, from a target image to be processed, the image to be processed being an inside of a human body;
 generating a mask image by setting the luminance value of a region other than the mask region to zero in the image to be processed;
 specifying a portion of a region around the mask region that overlaps with the edge, such that the specified portion is defined as that which satisfies a condition for luminance in the mask image;
 expanding the mask region to the peripheral region excluding the specified portion by a set number of pixels along an outer edge of the mask region;
 smoothing the luminance value of an entirety of the target image to be processed to generate a luminance value smoothed image;
 specifying a region matching the expanded mask region in the luminance value smoothed image;
 setting the luminance value of a region other than the specified region matching the expanded mask region in the luminance value smoothed image to zero to generate a corrected image; and
 synthesizing the corrected image with the target image to be processed to generate a new image.

10. The non-transitory computer readable recording medium according to claim 9, wherein the processing further comprises
 expanding the mask image by removing the specified portion that satisfies the condition for the luminance.

11. The non-transitory computer readable recording medium according to claim 9, wherein
 in the expanding the mask region,
 comparing an edge extracted from the target image to be processed with the region around the mask region and
 specifying a portion where both overlap as the portion satisfying the condition for luminance.

12. The non-transitory computer readable recording medium according to claim 9, wherein
 in the generating the luminance value smoothed image,
 generating the luminance value smoothed image by setting a change in the luminance value in the entire target image to be processed to be equal to or less than a threshold value.

* * * * *